June 26, 1928. 1,675,304
C. W. DAKE
DISTRIBUTION VALVE FOR STEAM ENGINES AND THE LIKE
Filed June 16, 1926 3 Sheets-Sheet 1

INVENTOR
Charles W. Dake
BY
ATTORNEYS.

June 26, 1928.  1,675,304
C. W. DAKE
DISTRIBUTION VALVE FOR STEAM ENGINES AND THE LIKE
Filed June 16, 1926   3 Sheets-Sheet 2

INVENTOR
Charles W. Dake
BY
ATTORNEYS.

June 26, 1928.
C. W. DAKE
1,675,304
DISTRIBUTION VALVE FOR STEAM ENGINES AND THE LIKE
Filed June 16, 1926     3 Sheets-Sheet 3
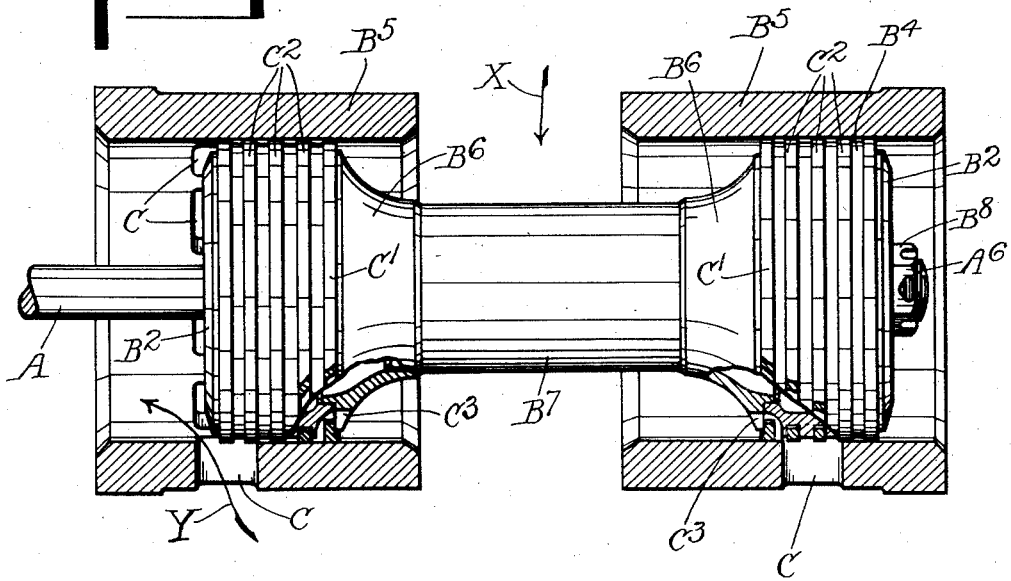
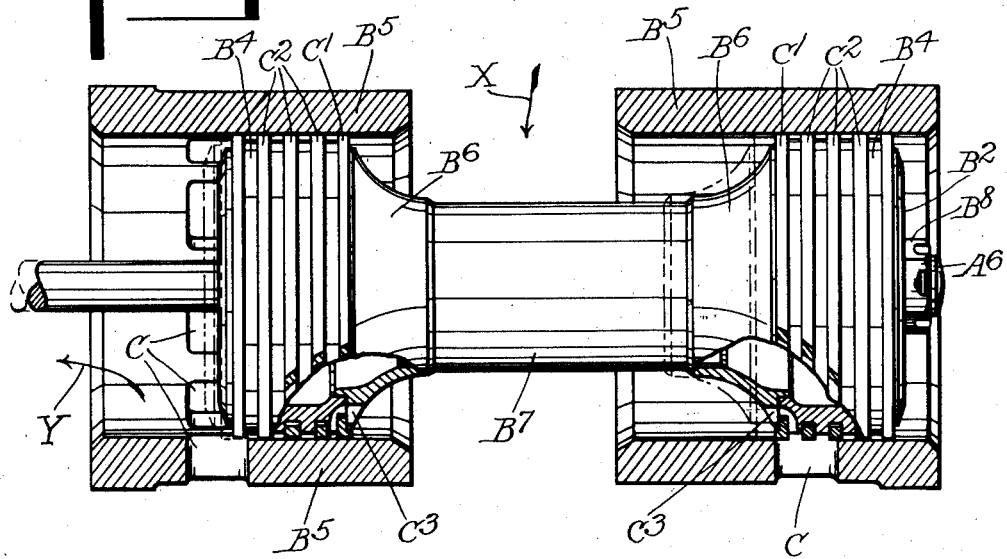
INVENTOR
Charles W. Dake
BY
ATTORNEYS.

Patented June 26, 1928.

1,675,304

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

DISTRIBUTION VALVE FOR STEAM ENGINES AND THE LIKE.

Application filed June 16, 1926. Serial No. 116,336.

My invention relates to improvements in distribution valves for steam engines and the like and has particular reference to what is called a duplex valve, that is, a valve wherein the time at which the major part of the working supply of steam is fed into the cylinder, is different from the time when a certain smaller part of the working supply is fed and wherein a moving valve element in cooperation with the valve port accomplishes this double time control.

I provide in connection with the moving valve element an auxiliary port or passage through such element extending behind the cut off face of the valve. This small port or passage closes after the partial closure of the port and allows steam to enter the cylinder after the main valve part has partially closed the port. This gives in general the same effect as a change in the valve control, and makes it possible to start heavier loads and to carry heavier loads at low speeds than is otherwise the case and becomes altogether inoperative when the speeds are high because the little auxiliary port or passage is so small that at high speeds it exerts a negligible and indistinguishable effect. This makes it possible to get the most satisfactory engine operating conditions without the necessity of long valve travel or complicated valve gearing. The advantage of eliminating complicated valve gearing is obvious, the advantage of eliminating long valve travel is that lubrication difficulties become very serious when the high valve piston speeds required to permit long valve travel are used.

My invention is illustrated more or less diagrammatically in the accompanying drawings, wherein—

Figure 4 is a side elevation in part section of the piston valve showing the valve seat in section with one end of the valve in the fully closed position;

Figure 5 is a similar view showing the same end of the valve in a slightly different position.

Like parts are indicated by like characters throughout the specification and drawings.

Figure 1:
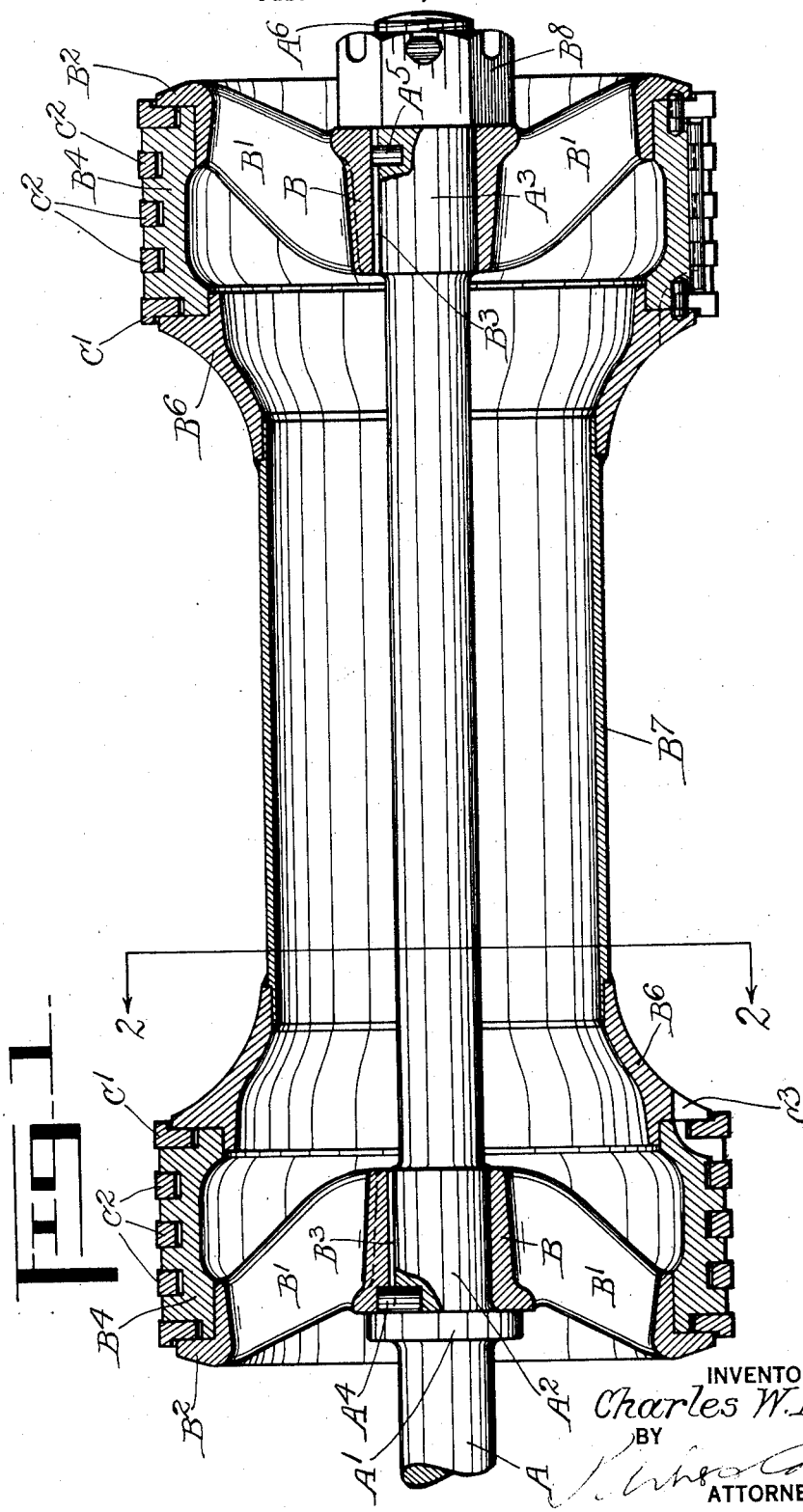
Figure 1 is a longitudinal section through a steam engine piston valve embodying my invention.
Figure 2:
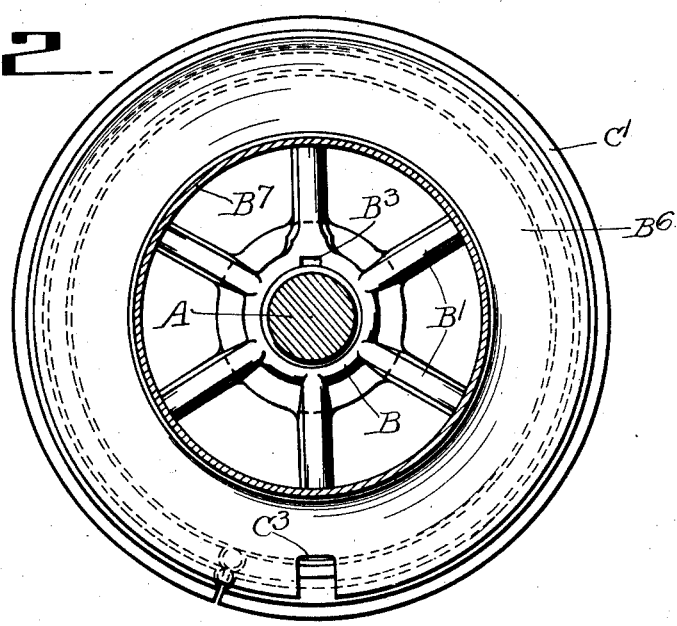
Figure 2 is a section along the line 2—2 of Figure 1.
Figure 3:
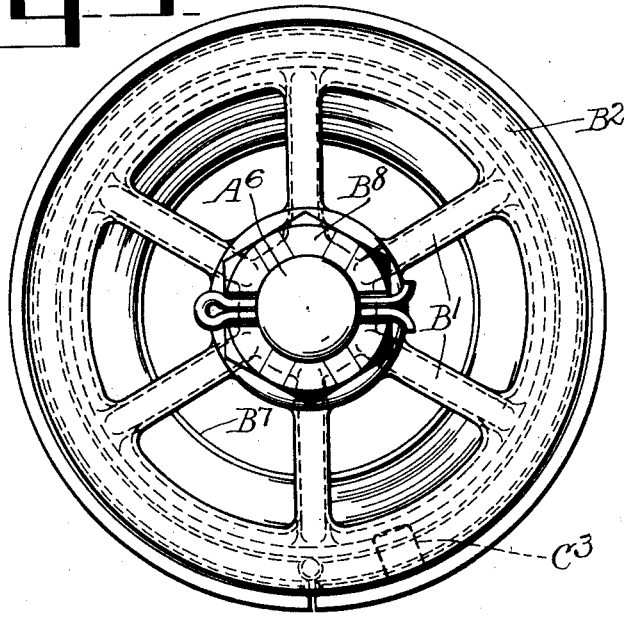
Figure 3 is an end view of the piston valve.

A is a valve stem flanged at $A^1$ and having enlarged bearing surfaces $A^2$ adjacent the flange $A^1$ and $A^3$ adjacent the end of the stem; $A^4$ is a lock pin projecting from the bearing surface $A^2$. The rod A is reduced at $A^6$ at the bearing surface $A^3$ and there threaded.

The two piston heads, there being one at each end and adapted to fit upon the bearing members $A^2$ $A^3$ comprise hubs B, spokes $B^1$, and flange rims $B^2$. These heads are opposed as indicated with the flanges at the end of the pistons. The hubs B both having longitudinal keyways $B^3$ and one of the hubs B is cut away to engage the pin $A^4$ where it seats upon the flange $A^1$. The keyway of the other hub fits the pin $A^5$; thus the two hubs are held against rotation with respect to the valve stem. Carried by the flange rims $B^2$ are cylindrical working members $B^4$. These members located one at either end of the valve, travel along and engage the valve cylinder, sleeve or bushings $B^5$. They are engaged along their sides removed from the flange wheel by conical filler members $B^6$ which in turn are separated by the cylindrical valve body $B^7$. The nut $B^8$ when screwed up on the threaded end of the stem compresses the separate elements above referred to comprisng the valve, against the flange $A^1$ and the pressure of the nut holds all the parts together.

The sleeves $B^5$ are ported at C, these ports being adapted to be controlled by the working valve elements which are so disposed that the rings $C^1$ form the main cut off edge of the valve. The outer peripheries of the members $B^4$ contain other packing rings $C^2$ $C^2$ all of which are in frictional contact with the sleeves $B^5$ and prevent steam leakage. $C^3$ is a port extending through the members $B^6$ and members $B^4$ and discharging through the face of the member $B^4$ between the ring $C^1$ and one of the rings $C^2$ so that steam may pass from the space surrounding the cylinder body $B^7$ into the port and thence to the engine cylinder, even when the major portion of the ports are closed by the working part of the piston. The end of the port or channel $C^3$ forms the auxiliary cut off edge and until this auxiliary cut off edge passes the edge of the port in the bushing steam in reduced quantity continues to be fed to the engine cylinder though in gradually reduced quantity as the piston valve continues its travel towards the final cut off. The steam, of course, enters the valve cylinder in the direction shown by the arrow X and the exhaust leaves it in the direction of the arrow Y in Figure 4. The parts are shown with the steam leading to the right hand end of the engine cylinder completely cut off and the passage C³ is closed. The ports leading to the left hand end of the engine cylinder are slightly open for the commencement of the exhaust. In Figure 5, the exhaust is wider open, the port C is not yet open but a small amount of steam is allowed to pass in through the passage C³. This gives an early opening for the steam. Further movement of the valve toward the right would result in wider opening of the exhaust at the left end and full opening of the steam passage at the right hand end. As the valve returns back toward the position shown in Figure 5, the steam will be cut off but a small amount of steam will still pass in toward the end of the stroke so that a small additional quantity of steam is allowed to enter at the two ends of the stroke when it is especially needed at low speeds. Obviously if the speeds are great, the time during which any steam will pass through the auxiliary passage is so slight that the amount of steam which can pass in will be so slight in proportion to the amount of steam normally passing that the effect of this auxiliary passage will be greatly minimized and to all practical purposes eliminated, but at low speeds when valve movement is relatively slow the effect of this retarded final closing of the steam supply will be to give a longer time during which steam is fed to the working end of the cylinder, thus enabling the engine to carry heavier loads at lower speeds.

I claim:

1. A distribution valve for steam engines comprising a piston having enlarged ends, packing rings carried by the enlarged ends, a ported valve bushing in which the piston reciprocates, the enlarged ends of the piston having main cut off edges adapted to traverse the ports, a longitudinal channel in the outer periphery of each enlarged end extending inwardly along the working surface thereof from the cut off edge, a packing ring in each enlarged end bridging the longitudinal channel.

2. A distribution valve for steam engines comprising a piston having enlarged ends, packing rings carried by the enlarged ends, a ported valve bushing in which the piston reciprocates, the enlarged ends of the piston having main cut off edges adapted to traverse the ports, a longitudinal channel in the outer periphery of each enlarged end extending inwardly along the working surface thereof from the cut off edge, a packing ring in each enlarged end forming the main cut off edge and bridging the longitudinal channel.

Signed at Chicago, county of Cook, and State of Illinois, this 10th day of June, 1926.

CHARLES W. DAKE.